United States Patent
Kang et al.

(10) Patent No.: US 12,234,392 B2
(45) Date of Patent: Feb. 25, 2025

(54) HOT-MELT ADHESIVE COMPOSITION FOR WATER TREATMENT ELEMENT, ADHESIVE FILM, AND WATER TREATMENT ELEMENT COMPRISING SAME

(71) Applicant: LG CHEM, LTD., Seoul (KR)

(72) Inventors: Hosung Kang, Daejeon (KR); Se Jeong Hwang, Daejeon (KR); Phill Lee, Daejeon (KR); Kwang Hwan Kim, Daejeon (KR); Taeyoung Park, Taeyoung (KR); Sangbum Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 201 days.

(21) Appl. No.: 17/635,853

(22) PCT Filed: Dec. 11, 2020

(86) PCT No.: PCT/KR2020/018148
§ 371 (c)(1),
(2) Date: Feb. 16, 2022

(87) PCT Pub. No.: WO2021/118289
PCT Pub. Date: Jun. 17, 2021

(65) Prior Publication Data
US 2022/0298384 A1    Sep. 22, 2022

(30) Foreign Application Priority Data

Dec. 11, 2019 (KR) ................. 10-2019-0164847
Dec. 11, 2019 (KR) ................. 10-2019-0164850
(Continued)

(51) Int. Cl.
*B32B 41/00* (2006.01)
*C09J 5/06* (2006.01)
(Continued)

(52) U.S. Cl.
CPC ............. *C09J 5/06* (2013.01); *C09J 11/04* (2013.01); *C09J 175/04* (2013.01); *C08K 2003/2272* (2013.01); *C08K 2201/01* (2013.01)

(58) Field of Classification Search
CPC ....... C09J 5/06; C09J 11/04; C09J 7/35; C09J 2301/408; C09J 175/02; C09J 201/00;
(Continued)

(56) References Cited

U.S. PATENT DOCUMENTS

2009/0242123 A1  10/2009  Zhang et al.
2012/0234488 A1*  9/2012  Ulicny .................. C09J 11/00
                                              156/272.4
(Continued)

FOREIGN PATENT DOCUMENTS

CN    106153514 A    11/2016
CN    107384251 A    11/2017
(Continued)

*Primary Examiner* — Michael N Orlando
*Assistant Examiner* — Joshel Rivera
(74) *Attorney, Agent, or Firm* — Bryan Cave Leighton Paisner LLP

(57) ABSTRACT

Provided is a hot-melt adhesive composition containing a polymer resin and a magnetic composite for a water treatment element, an adhesive film, and a water treatment element including the same.

11 Claims, 2 Drawing Sheets

(30) Foreign Application Priority Data

Dec. 11, 2019 (KR) .......................... 10-2019-0164854
Dec. 11, 2019 (KR) .......................... 10-2019-0164867

(51) Int. Cl.
*C09J 11/04* (2006.01)
*C09J 175/04* (2006.01)
*C08K 3/22* (2006.01)

(58) Field of Classification Search
CPC ........ C08K 2003/2272; C08K 2201/01; B01D 61/02; C02F 1/44
USPC .................... 156/60, 64, 350, 351, 378, 379
See application file for complete search history.

(56) References Cited

U.S. PATENT DOCUMENTS

| | | |
|---|---|---|
| 2014/0014569 A1 | 1/2014 | Hirozawa et al. |
| 2014/0151286 A1 | 6/2014 | Hirozawa et al. |
| 2014/0231332 A1 | 8/2014 | Hirozawa et al. |
| 2015/0259583 A1 | 9/2015 | Kahle et al. |
| 2016/0230047 A1 | 8/2016 | Varn et al. |
| 2017/0001154 A1 | 1/2017 | Marutani et al. |
| 2019/0127609 A1 | 5/2019 | Johnson et al. |
| 2019/0136098 A1 | 5/2019 | Schrodel et al. |
| 2021/0032433 A1 | 2/2021 | Ahn et al. |
| 2022/0298384 A1 | 9/2022 | Kang et al. |

FOREIGN PATENT DOCUMENTS

| | | | |
|---|---|---|---|
| CN | 109312201 | A | 2/2019 |
| JP | H05311134 | A | 11/1993 |
| JP | 2000-279771 | | 10/2000 |
| JP | 2011-518239 | | 6/2011 |
| JP | 4753488 | B2 * | 8/2011 |
| JP | 2017-105992 | | 6/2017 |
| JP | 2017135323 | A * | 8/2017 |
| JP | 2018-516755 | | 6/2018 |
| JP | 2019-052232 | | 4/2019 |
| JP | 2019-518125 | | 6/2019 |
| KR | 10-2000-0019746 | A | 4/2000 |
| KR | 10-2003-0004493 | | 1/2003 |
| KR | 10-2007-0062058 | | 6/2007 |
| KR | 10-2007-0109493 | A | 11/2007 |
| KR | 10-2014-0016901 | | 2/2014 |
| KR | 10-2014-0040200 | | 4/2014 |
| KR | 10-2014-0082677 | | 7/2014 |
| KR | 10-2016-0060737 | | 5/2016 |
| KR | 10-2016-0108392 | A | 9/2016 |
| KR | 10-2016-0116608 | | 10/2016 |
| KR | 10-2016-0123900 | | 10/2016 |
| KR | 10-2016-0141752 | | 12/2016 |
| KR | 10-2018-0060487 | | 6/2018 |
| KR | 10-2019-0094126 | | 8/2019 |
| KR | 10-2024257 | | 9/2019 |
| KR | 10-2734285 | B | 11/2024 |
| WO | 2016-149361 | | 9/2016 |
| WO | 2019/151844 | A1 | 8/2019 |

* cited by examiner

[Figure 1]
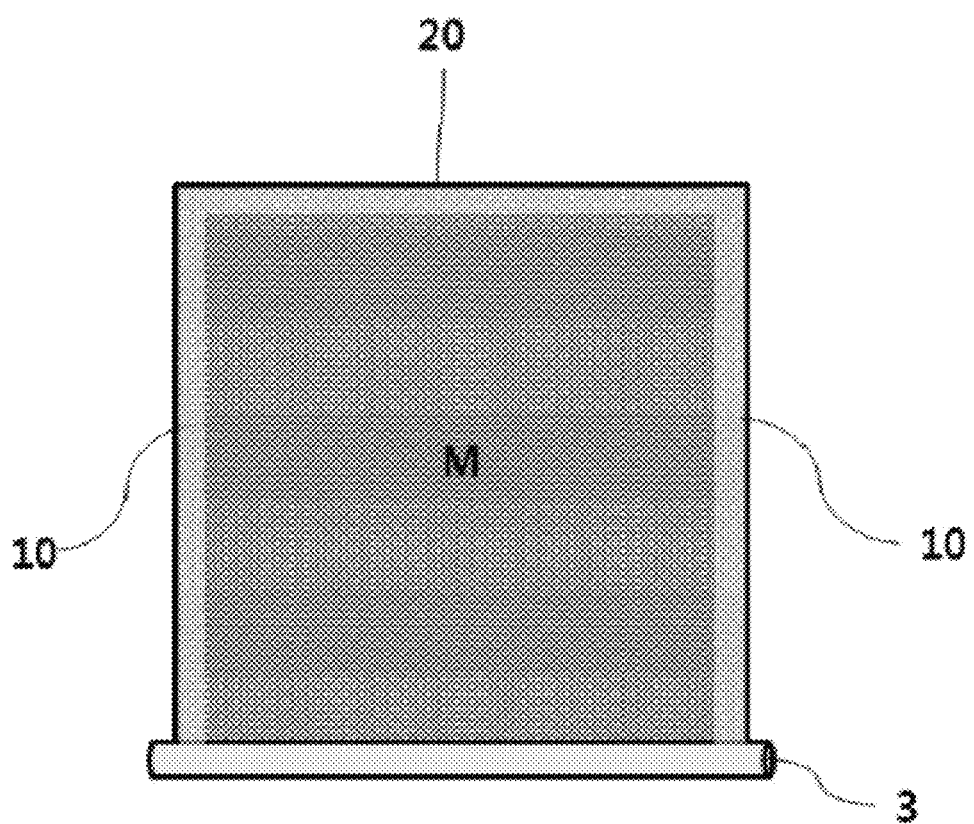

[Figure 2]
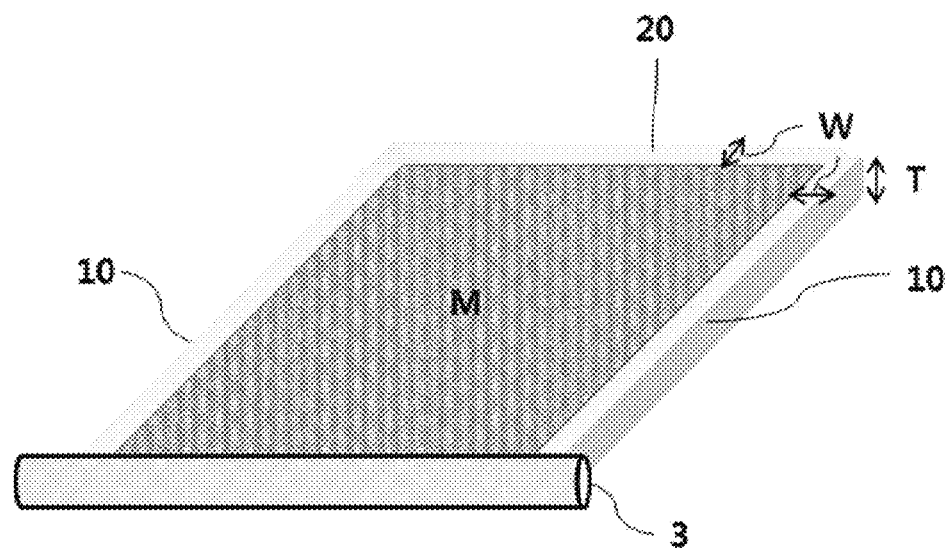
[Figure 3]
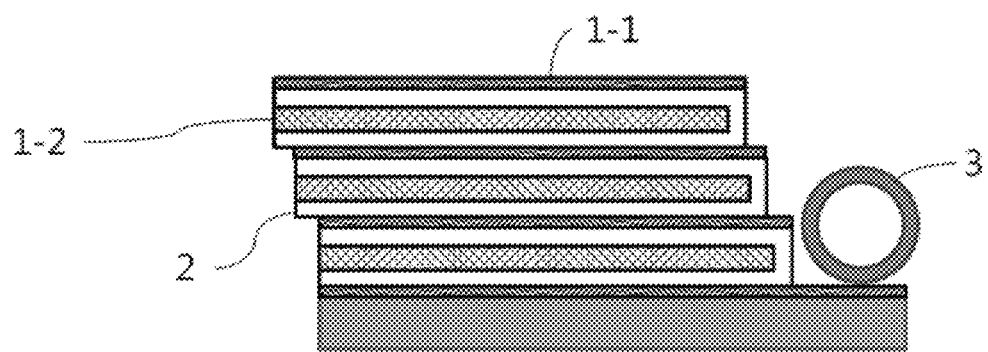

HOT-MELT ADHESIVE COMPOSITION FOR WATER TREATMENT ELEMENT, ADHESIVE FILM, AND WATER TREATMENT ELEMENT COMPRISING SAME

CROSS-REFERENCE TO RELATED APPLICATIONS

This application is a National Stage Application of International Application No. PCT/KR2020/018148 filed on Dec. 11, 2020, which claims the benefit of the filing dates of Korean Patent Application No. 10-2019-0164847, filed on Dec. 11, 2019, in the Korean Intellectual Property Office, Korean Patent Application No. 10-2019-0164854, filed on Dec. 11, 2019, in the Korean Intellectual Property Office, Korean Patent Application No. 10-2019-0164850, filed on Dec. 11, 2019, in the Korean Intellectual Property Office, and Korean Patent Application No. 10-2019-0164867, filed on Dec. 11, 2019, in the Korean Intellectual Property Office, the entire contents of which are incorporated herein by reference.

TECHNICAL FIELD

The present disclosure relates to a hot-melt adhesive composition for a water treatment element, an adhesive film, and a water treatment element including the same.

BACKGROUND

Membrane fabrication and process technologies have been used in a wide range of applications, from a simple laboratory-scale process to a large-scale industrial process, according to social demands such as production of high-purity and high-functional materials and protection of the global environment.

Among them, water purification technology, which is a technology for ensuring alternative water resources, has attracted attention as the phenomenon of water shortage due to global warming has been intensified worldwide. Thus, it is expected that a water treatment process using a reverse osmosis membrane, which is a core technology of next-generation water supply using alternative water resources such as seawater desalination and reuse of water, will lead the water industry market. The reverse osmosis membrane permeate water produced by this reverse osmosis membrane becomes pure water or water close to infinitely pure water, and has been used in various fields, such as sterile water for medical use, purified water for dialysis, or water for semiconductor manufacturing in the electronics industry.

In addition, membranes have been widely applied in the field of separation of gases including hydrogen and oxygen.

BRIEF DESCRIPTION

Technical Problem

The present disclosure provides a hot-melt adhesive composition for a water treatment element, an adhesive film, and a water treatment element including the same.

Technical Solution

One embodiment of the present disclosure provides a hot-melt adhesive composition for a water treatment element, the hot-melt adhesive composition containing a polymer resin and a magnetic composite.

Another embodiment of the present disclosure provides an adhesive film including the above-described hot-melt adhesive composition for a water treatment element.

Still another embodiment of the present disclosure provides a water treatment element including the above-described adhesive film.

Advantageous Effects

Where a water treatment element is produced using the hot-melt adhesive composition for a water treatment element according to one exemplary embodiment of the present disclosure, it is possible to increase the effective membrane area of the water treatment element, increase the productivity of the water treatment element, reduce the defect rate of the water treatment element, and improve workability.

BRIEF DESCRIPTION OF THE DRAWINGS

FIG. 1 shows a plan view of a membrane leaf including an adhesive film composed of a hot-melt adhesive composition for a water treatment element.

FIG. 2 shows a perspective view of a membrane leaf including an adhesive film composed of a hot-melt adhesive composition for a water treatment element.

FIG. 3 is a schematic view showing a stack of components constituting a water treatment element according to the present disclosure.

DESCRIPTION OF REFERENCE NUMERALS

1-1: Permeate-side channel member
1-2: Feed-side channel member
2: Membrane leaf
3: Center tube
10: Adhesive films for a pair of opposite side seals of a membrane leaf
20: Adhesive films for end seal perpendicular to a pair of opposite side seals of a membrane leaf
M: Membrane leaf
T: Thickness
W: Width

DETAILED DESCRIPTION

Throughout the present specification, when any member is referred to as being "on" another member, it not only refers to a case where any member is in contact with another member, but also a case where a third member exists between the two members.

Throughout the present specification, it is to be understood that when any part is referred to as "including" any component, it does not exclude other components, but can further include other components, unless otherwise specified.

One embodiment of the present disclosure provides a hot-melt adhesive composition for a water treatment element, the hot-melt adhesive composition containing a polymer resin and a magnetic composite.

A common water treatment element is produced in a spiral wound form, and a water treatment membrane is generally sealed using a liquid polyurethane adhesive composition to prevent raw water and product water from mixing with each other. The use of the liquid polyurethane adhesive composition imposes limitations as described below. Since the adhesive area is large, the loss of the membrane such as a decrease in the effective area thereof can occur in a process of cutting out an unnecessary portion of the adhesive area. In addition, there is a disadvantage in that, since the liquid adhesive composition is not immediately set after application, it is difficult to control the thickness and area thereof. Moreover, the defect rate of the water treatment element can increase due to leaks occurring during a rolling process. In addition, there is a disadvantage in that the curing time of the liquid adhesive composition is long.

However, the hot-melt adhesive composition for a water treatment element according to the present disclosure is in a solid form and in a film form and includes the magnetic composite to which induction heating is applicable, and thus where the hot-melt adhesive composition is applied to a water treatment element, it is possible to increase the productivity of the water treatment element, reduce the defect rate thereof, and improve workability.

Specifically, since the hot-melt adhesive composition for a water treatment element according to the present disclosure is in a solid form, it is easy to control the adhesive area and thickness thereof, and thus an operation of rolling the water treatment element is easy. In addition, the hot-melt adhesive composition for a water treatment element according to the present disclosure has an advantage in that it has excellent chemical resistance and water resistance because the degree of changes in physical properties thereof by external environmental factors such as humidity and temperature is small. In addition, since the curing time thereof is short and the curing process thereof is simplified, it is possible to improve workability in the process of producing the water treatment element.

When a hot-melt adhesive composition for a water treatment element does not contain the magnetic composite, and the adhesive composition is used for production of a water treatment element, selective heating of the adhesive composition is impossible because the adhesive composition has no induction heating function. However, since the hot-melt adhesive composition for a water treatment element according to the present disclosure contains the magnetic composite, selective heating thereof is possible, which makes it possible to perform attachment of the adhesive composition without causing damage to a water treatment membrane in the process of producing a water treatment element.

In one embodiment of the present disclosure, the hot-melt adhesive composition for a water treatment element can be cured under conditions of a temperature of 150° C., a pressure of 70 kg/cm² and a curing time of 30 seconds, and the hot-melt adhesive composition for a water treatment element can be cured within 30 seconds at a temperature of 150° C. and a pressure of 70 kg/cm². Furthermore, the hot-melt adhesive composition for a water treatment element can be cured under conditions of a temperature of 110 to 150° C., a pressure of 60 to 70 kg/cm² and a curing time of 20 to 30 seconds.

Hereinafter, the present disclosure will be described in more detail. In one embodiment of the present disclosure, the polymer resin is present in an amount of 90 to 99.9 parts by weight based on 100 parts by weight of the hot-melt adhesive composition, and the magnetic composite is present in an amount of 0.1 to 10 parts by weight based on 100 parts by weight of the hot-melt adhesive composition.

In one embodiment of the present disclosure, the polymer resin can be produced to include, but not limited to, polyurethane, polyester, polyamide, or polyether.

In one embodiment of the present disclosure, the weight-average molecular weight of the polyurethane can be, but is not limited to, 30,000 g/mol to 1,000,000 g/mol.

The weight-average molecular weight can be measured using gel permeation chromatography (GPC).

In one embodiment of the present disclosure, the content of the polyurethane is 90 to 99.9 parts by weight based on 100 parts by weight of the hot-melt adhesive composition, and the content of the magnetic composite is 0.1 to 10 parts by weight based on 100 parts by weight of the hot-melt adhesive composition.

In one embodiment of the present disclosure, the content of the polyurethane can be 90 to 99 parts by weight, 91 to 99 parts by weight, 92 to 99 parts by weight, 93 to 99 parts by weight, 94 to 99 parts by weight, 90 to 98 parts by weight, 90 to 97 parts by weight, 90 to 96 parts by weight, or 94 to 96 parts by weight, based on 100 parts by weight of the hot melt adhesive composition.

In one embodiment of the present disclosure, the content of the magnetic composite can be 1 to 10 parts by weight, 1 to 9 parts by weight, 1 to 8 parts by weight, 1 to 7 parts by weight, 1 to 6 parts by weight, 2 to 10 parts by weight, 3 to 10 parts by weight, 4 to 10 parts by weight, or 4 to 6 parts by weight, based on 100 parts by weight of the hot melt adhesive composition.

In one embodiment of the present disclosure, the magnetic composite refers to a material that includes magnetic particles and generates heat when an external alternating magnetic field is applied thereto.

Since the magnetic composite includes magnetic particles, an induction heating method can be applied thereto.

The magnetic particles are not particularly limited as to their chemical composition, as long as they can generate heat by application of an electromagnetic field thereto, that is, induction heating. For example, the magnetic particles can include a compound of Formula 1:

$$MX_aO_b \qquad \text{<Formula 1>}$$

wherein M is a metal or a metal oxide, X includes Fe, Mn, Co, Ni or Zn, and $|a \times c| = |b \times d|$ is satisfied, where c is the cation charge of X and d is the anion charge of oxygen. In one example, M in Formula 1 can be Fe, Mn, Mg, Ca, Zn, Cu, Co, Sr, Si, Ni, Ba, Cs, K, Ra, Rb, Be, Li, Y, B, or an oxide thereof. For example, when $X_aO_b$ is $Fe_2O_3$, c can be +3 and d can be −2. Also, for example, when $X_aO_b$ is $Fe_3O_4$, it can be expressed as $FeOFe_2O_3$, and thus c can be +2 and +3, respectively, and d can be −2. The structure of the compound included in the magnetic particles is not particularly limited as long as it satisfies Formula 1 above. For example, the compound can be $FeOFe_2O_3$.

The magnetic particles can be composed of the compound of Formula 1, or can include a compound obtained by doping the compound of Formula 1 with an inorganic material. The inorganic material can include monovalent to trivalent cationic metals or oxides thereof, and a plurality of (two or more) cationic metals can also be used as the inorganic material.

According to one embodiment of the present disclosure, the magnetic particles or clusters of the magnetic particles can be iron oxide.

In one embodiment of the present disclosure, the magnetic particles can have an individual particle diameter of 15 nm to 40 nm. Here, the individual particle diameter means the individual particle diameter of each particle.

In one embodiment of the present disclosure, the magnetic particles can form magnetic particle clusters. The magnetic particle clusters refer to secondary particles that are agglomerates formed by agglomeration of the magnetic particles which are primary particles.

In one embodiment of the present disclosure, magnetic particles, which are primary particles constituting the magnetic particle clusters, can have an individual particle diameter of 15 nm to 40 nm. The average particle diameter of the primary particles constituting the magnetic particle clusters can be determined by the average crystal size thereof, and the particle diameter of the primary particles constituting the magnetic particle clusters can be represented by the size of crystals within the magnetic particle clusters. In other words, the crystal size of the magnetic particle clusters, or the crystal size of the magnetic composite can be 15 nm to 40 nm.

Here, the magnetic particles, which are primary particles, are particles formed by crystal growth, and have the same crystal characteristics, and the magnetic particle clusters are secondary particles formed by agglomeration of the primary particles and have various crystal characteristics because the characteristics of crystals in the magnetic particle clusters are influenced by the crystal characteristics of the primary particles. Thus, the results of analyzing the crystal characteristics of the finally produced magnetic particle clusters or magnetic composite are the characteristics of the magnetic particles which are primary particles.

In one embodiment, a surface treatment agent can be present around the magnetic particle clusters. That is, the magnetic composite of the present disclosure includes magnetic particles and a surface treatment agent provided on the surfaces thereof, and preferably includes magnetic particle clusters and a surface treatment agent provided on the surfaces thereof.

The crystal size of the magnetic particles, which are primary particles included in the magnetic composite, can be controlled by a method of adding the surface treatment agent during production of the magnetic composite, and the heat generation characteristics thereof can also be controlled by controlling the average particle diameter of the magnetic particles which are primary particles.

In one embodiment of the present disclosure, the magnetic composite includes magnetic particles having an average crystal size of 15 nm to 40 nm, and the crystal size is preferably 20 nm to 35 nm.

Where the magnetic particles satisfy the crystal size within the above-described range, it is possible to increase the heat generation amount of the magnetic composite.

The crystal size of the magnetic particles can be measured using X-ray diffraction analysis (XRD). Specifically, a 2θ range of 10° to 90° is measured using an XRD-07-D8_Endeavor system (Bruker). The size of the crystal (τ) is calculated using a range of 60.824° to 64.957° including the 62.57° peak. The Scherrer equation ($\tau=(K\times\lambda)/(\beta\times\cos(\theta))$) built into the DIFFRAC.SUITE EVA program can be used, and the K value can be set to 0.94 for calculation.

In one embodiment of the present disclosure, the average particle diameter of the magnetic particle clusters is 20 nm to 300 nm. Preferably, the average particle diameter of the magnetic particle clusters is 60 nm to 200 nm, more preferably 80 nm to 120 nm.

The average particle diameter of the magnetic particle clusters can be measured using a scanning electron microscope (SEM) after preparing a specimen.

Specifically, the specimen can be prepared by coating the magnetic particle clusters with platinum (Pt). The platinum (Pt) coating can be performed using a Cressington Sputter Coater 108 model, and the specimen can be prepared by coating in an auto mode for 60 seconds to 90 seconds. The scanning electron microscope (SEM) can be an FESEM (JSM7610F, JEOL Co., Ltd.). Through a scanning electron microscope (SEM) photograph of the specimen, whether nanoclusters of the magnetic particles would be formed can be checked and the average particle diameter of the magnetic particles can be calculated.

In one embodiment of the present disclosure, the magnetic composite includes a surface treatment agent. Here, the surface treatment agent refers to a material that can be used to treat the surfaces of the magnetic particles to impart new properties that are not inherent, and in particular, a surface treatment agent, which imparts dispersion characteristics to the magnetic particles so that the magnetic particles can be evenly dispersed in a product to which the magnetic particles are to be applied, can be referred to as a dispersant. Even though the surface treatment agent is a surface treatment agent that imparts dispersion characteristics to the magnetic particles, it can also impart other surface characteristics together with the dispersion characteristics.

In one embodiment of the present disclosure, as the surface treatment agent, it is possible to apply a compound having a functional group capable of bonding to the surface of a precursor of the magnetic particles, the surfaces of the magnetic particles or the surfaces of the magnetic particle clusters with strong bonding strength. As the compound having the functional group, a compound having a phosphoric acid group, a carboxyl group, a sulfonic acid group, an amino group, and/or a cyano group can be applied. Thus, the magnetic particles, the precursor of the magnetic particles, or the magnetic particle clusters can be surface-treated with a material having the above functional group, that is, a surface treatment agent.

Examples of compounds that can be applied as the surface treatment agent in the present disclosure include a polyol-based compound, a polysiloxane-based compound, an alkyl phosphoric acid-based surface treatment agent (e.g., a compound of the following Formula A), an alkyl carboxylic acid-based surface treatment agent (e.g., a compound of the following Formula B), an alkyl sulfonic acid-based surface treatment agent (e.g., a compound of the following Formula C), other acid compounds containing long-chain alkyl groups, an acrylic copolymer containing an acidic functional group or an amino group, an aromatic acid-based surface treatment agent, a block copolymer containing an acidic functional group or an amino group, and the like:

<Formula A>

<Formula B>

<Formula C> wherein in Formulas A to C, $R_1$ to $R_3$ are each independently an alkyl group, an arylalkyl group, an alkoxy group, or an arylalkoxy group.

An alkyl group or alkoxy group that can be contained in Formulas A to C above can be, for example, an alkyl group or alkoxy group having 6 to 24 carbon atoms. In other examples, the number of carbon atoms in the alkyl group or alkoxy group can be about 7 or more, 8 or more, 9 or more, 10 or more, 11 or more, 12 or more, 13 or more, 14 or more, 15 or more, 16 or more, 17 or more, 18 or more, 19 or more, 20 or more, 21 or more, 22 or more, or 23 or more, or can be about 23 or less, 22 or less, 21 or less, 20 or less, 19 or less, 18 or less, 17 or less, 16 or less, 15 or less, 14 or less, 13 or less, 12 or less, 11 or less, 10 or less, 9 or less, 8 or less, or 7 or less.

The alkyl group or alkoxy group that can be contained in Formulas A to C above can be substituted with an aryl group having about 6 to 13 carbon atoms, and for example, a benzyl group or a phenyl group can be applied as the substituent.

In addition, other examples of surface treatment agents that can be applied include: (a) phosphoric ester salts of amino group-containing oligomers or polymers, such as phosphoric ester salts of optionally fatty acid-modified or alkoxylated (especially ethoxylated) polyamines, phosphoric ester salts of epoxide-polyamine adducts, phosphoric ester salts of amino group-containing acrylate or methacrylate copolymers, or phosphoric ester salts of acrylate-polyamine adducts; (b) monoesters or diesters of phosphoric acid, such as monoesters or diesters of phosphoric acid with alkyl, aryl, aralkyl or alkylaryl alkoxylates, for example (e.g., phosphoric monoesters or diesters of nonylphenol ethoxylates, isotridecyl alcohol ethoxylates, butanol-started alkylene oxide polyethers), and monoesters or diesters of phosphoric acid with polyesters (e.g. lactone polyesters, such as caprolactone polyesters or mixed caprolactone/valerolactone polyesters); (c) acidic dicarboxylic monoesters, such as acidic dicarboxylic monoesters (especially those of succinic acid, maleic acid or phthalic acid) with alkyl, aryl, aralkyl or alkylaryl alkoxylates (e.g., nonylphenol ethoxylates, isotridecyl alcohol ethoxylates or butanol-started alkylene oxide polyethers); (d) polyurethane-polyamine adducts; (e) polyalkoxylated monoamines or diamines (e.g., ethoxylated oleylamine or alkoxylated ethylenediamine); or (f) reaction products of unsaturated fatty acids with mono-, di-, and polyamines, amino alcohols, and unsaturated 1,2-dicarboxylic acids and their anhydrides and their salts and alcohols and/or reaction products with amines.

The surface treatment agents described above are known as commercial products, and for example, it is possible to use surface treatments available from BYK-Chemie Wesel under trade names such as BYK-220 S, BYK-P 9908, BYK-9076, BYK-9077, BYK-P 104, BYK-P 104 S, BYK-P 105, BYK-W 9010, BYK-W 920, BYK-W 935, BYK-W 940, BYK-W 960, BYK-W 965, BYK-W 966, BYK-W 975, BYK-W 980, BYK-W 990, BYK-W 995, BYK-W 996, BYKUMEN, BYKJET 9131, LACTIMON, ANTI-TERRA-202, ANTI-TERRA-203, ANTI-TERRA-204, ANTI-TERRA-205, ANTI-TERRA-206, ANTI-TERRA-207, ANTI-TERRA-U 100, ANTI-TERRA-U 80, ANTI-TERRA-U, LP-N-21201, LP-N-6918, DISPERBYK, DISPERBYK-101, DISPERBYK-102, DISPERBYK-103, DISPERBYK-106, DISPERBYK-107, DISPERBYK-108, DISPERBYK-109, DISPERBYK-110, DISPERBYK-111, DISPERBYK-112, DISPERBYK-115, DISPERBYK-116, DISPERBYK-118, DISPERBYK-130, DISPERBYK-140, DISPERBYK-142, DISPERBYK-145, DISPERBYK-160, DISPERBYK-161, DISPERBYK-162, DISPERBYK-163, DISPERBYK-164, DISPERBYK-165, DISPERBYK-166, DISPERBYK-167, DISPERBYK-168, DISPERBYK-169, DISPERBYK-170, DISPERBYK-171, DISPERBYK-174, DISPERBYK-176, DISPERBYK-180, DISPERBYK-181, DISPERBYK-182, DISPERBYK-183, DISPERBYK-184, DISPERBYK-185, DISPERBYK-187, DISPERBYK-190, DISPERBYK-191, DISPERBYK-192, DISPERBYK-193, DISPERBYK-194, DISPERBYK-2000, DISPERBYK-2001, DISPERBYK-2008, DISPERBYK-2009, DISPERBYK-2010, DISPERBYK-2020, DISPERBYK-2025, DISPERBYK-2050, DISPERBYK-2070, DISPERBYK-2090, DISPERBYK-2091, DISPERBYK-2095, DISPERBYK-2096, DISPERBYK-2150, DISPERBYK-2151, DISPERBYK-2152, DISPERBYK-2155, DISPERBYK-2163, DISPERBYK-2164, DISPERBLAST-1010, DISPERBLAST-1011, DISPERBLAST-1012, DISPERBLAST-1018, DISPERBLAST-I, or DISPERBLAST-P.

For an appropriate surface treatment effect, as the surface treatment agent, it is possible to use a surface treatment agent having an acid value within the range of 10 mgKOH/g to 400 mgKOH/g or an amine value within the range of 5 mgKOH/g to 400 mgKOH/g.

In other examples, the acid value of the surface treatment agent can be about 20 mgKOH/g or more, 30 mgKOH/g or more, 40 mgKOH/g or more, 50 mgKOH/g or more, 60 mgKOH/g or more, 70 mgKOH/g or more, 80 mgKOH/g or more, or 90 mgKOH/g or more, or can be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, or 100 mgKOH/g or less.

In other examples, the amine value of the surface treatment agent can be about 10 mgKOH/g or more, about 15 mgKOH/g or more, about 20 mgKOH/g or more, 30 mgKOH/g or more, 40 mgKOH/g or more, 50 mgKOH/g or more, 60 mgKOH/g or more, 70 mgKOH/g or more, 80 mgKOH/g or more, or 90 mgKOH/g or more, or can be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, or 100 mgKOH/g or less.

In the present specification, the term "amine value" refers to a value obtained by titrating the amine group ($-NH_2$, $-NHR$ or $-NR_2$) contained in the surface treatment agent with KOH and calculating the amount of KOH consumed (that is, a value expressed as the amount (mg) of KOH consumed per g of the surface treatment agent).

In addition, the term "acid value" refers to a value obtained by titrating the acid group ($-COOH$) contained in the surface treatment agent with KOH and calculating the amount of KOH consumed (that is, a value expressed as the amount (mg) of KOH consumed per g of the surface treatment agent).

Meanwhile, in order to ensure desired physical properties (viscosity, etc.), the surface treatment agent forming a bond with the magnetic particles or the magnetic particle clusters can preferably be a compound having a weight-average molecular weight (Mw) of about 20,000 g/mol or less. In the present specification, the term "weight-average molecular weight" is a value in terms of standard polystyrene determined by GPC (Gel Permeation Chromatography), and can be simply referred to as molecular weight unless otherwise specified. In addition, the unit of the molecular weight can be g/mol.

In other examples, the weight-average molecular weight of the surface treatment agent can be about 19,000 or less, 18,000 or less, 17,000 or less, 16,000 or less, 15,000 or less, 14,000 or less, 13,000 or less, 12,000 or less, 11,000 or less, 10,000 or less, 9,000 or less, 8,000 or less, 7,000 or less, 6,000 or less, 5,000 or less, 4,000 or less, 3,000 or less, 2,000 or less, or 1,000 or less, or can be 100 or more, 200 or more, 300 or more, 400 or more, 500 or more, 600 or more, 700 or more, 800 or more, 900 or more, or 1,000 or more.

In the present disclosure, the magnetic composite can be formed by a method of interacting the magnetic particles or the magnetic particle clusters with a specific functional group (specifically, an anchoring functional group) present in a compound having the specific functional group. Alternatively, when the surface treatment agent does not have the functional group, the magnetic composite can be formed by introducing the functional group to the surface treatment agent according to a known chemical method and then interacting the functional group with the magnetic particles or the magnetic particle clusters.

The proportion of the surface treatment agent in the magnetic composite is not particularly limited, and the surface treatment agent can be added in a proportion making it possible to produce a magnetic composite capable of satisfying the above-described conditions, for example, the average particle diameter of the magnetic particle clusters. For example, the surface treatment agent can be contained in a proportion within the range of 0.01 parts by weight to 30 parts by weight based on 100 parts by weight of the magnetic particles, or the surface treatment agent can be contained in a proportion within the range of 0.01 parts by weight to 30 parts by weight based on 100 parts by weight of the magnetic particle precursor. In this proportion, it is possible to obtain a magnetic composite having a desired heat generation property.

In the specification, the unit "parts by weight" means the ratio of weight between components, unless otherwise specified.

In other examples, the ratio can be 0.1 parts by weight or more, 1 part by weight or more, 2 parts by weight or more, 3 parts by weight or more, or 4 parts by weight or more, or can be 27 parts by weight or less, 25 parts by weight or less, 23 parts by weight or less, 21 parts by weight or less, or 20 parts by weight or less.

The method of obtaining the magnetic composite by surface-treating the magnetic particles with the surface treatment agent is not particularly limited. For example, by mixing the magnetic particles and the surface treatment agent in an appropriate environment such as the presence of a solvent, it is possible to induce an interaction between the magnetic particles and the surface treatment agent and to form a bond between the above-described magnetic particles and the surface treatment agent or between the surface treatment agent portions. This surface treatment agent can be present on the surface of the magnetic particles, specifically around the magnetic particles.

The present disclosure provides a method for producing a hot-melt adhesive composition for a water treatment element, the method including a step of producing a composition containing a magnetic composite and a polymer resin.

The present disclosure provides a method for producing a hot-melt adhesive composition for a water treatment element, the method including steps of: forming magnetic particles by heating a reaction solution containing a magnetic particle precursor and a solvent to a first temperature;

forming magnetic particle clusters by clustering the formed magnetic particles through heating to a second temperature;

producing a magnetic composite by adding a surface treatment agent to the solution containing the magnetic particle clusters; and producing a composition containing the magnetic composite and a polymer resin.

In one embodiment of the present disclosure, the magnetic particle precursor refers to a material capable of forming magnetic particles by post-treatment. As the magnetic particle precursor, any compound can be used without limitation as long as it can form the magnetic particles through hydrolysis, dehydration, reduction, and phase transition of the precursor. For example, when the magnetic particles are $FeOFe_2O_3$, a precursor of the magnetic particles can be, but is not limited to, one selected from $FeCl_3.6H_2O$ (iron (III) chloride hexahydrate), $FeCl_3$, $Fe(NO_3)_3$, $Fe(CO)_5$, $Fe(NO_3)_2$, $Fe(SO_4)_3$ or $Fe(AcAc)_3$ (iron (III) acetylacetonate).

In one embodiment of the present disclosure, the concentration of the magnetic particle precursor in the reaction solution can be 0.025 M to 0.125 M, preferably 0.05 M to 0.1 M. When the above concentration range is satisfied, there is an advantage in that it is possible to synthesize magnetic particles having a desired size and a uniform particle distribution.

In one embodiment of the present disclosure, the reaction solution can further contain a base. In this case, the concentration of the base can be 0.4 M to 4 M, preferably 0.5 M to 2 M. When the above concentration range is satisfied, there is an advantage in that it is possible to control the size of the magnetic particles.

In one embodiment of the present disclosure, the molar ratio between the magnetic particle precursor and the base in the reaction solution can be 1:5 to 1:20, specifically 1:9 to 1:10, preferably 1:9.5. In this case, there is an advantage in that a desired particle size can be obtained.

In one embodiment of the present disclosure, the base can be, for example, one selected from among strongly basic compounds such as sodium oxide and potassium hydroxide; and weakly basic compounds such as sodium carbonate, sodium hydrogen carbonate, cesium carbonate, calcium carbonate, aqueous ammonia or sodium acetate, but is not limited thereto.

In one embodiment of the present disclosure, the content of the solvent in the reaction solution can be 50 wt % or more, 55 wt % or more, 60 wt % or more, 65 wt % or more, 70 wt % or more, 75 wt % or more, 80 wt % or more, 85 wt % or more or 90 wt % or more, or can be 100 wt % or less, 99 wt % or less, 98 wt % or less, 97 wt % or less, 96 wt % or less or 95 wt % or less. When the above range is satisfied, the proportion of the solvent is large, and thus the solvent prevents the crystals of nanoparticles produced from forming large agglomerates.

In one embodiment of the present disclosure, the solvent in the reaction solution can contain water, and can further contain a polar solvent. The solvent preferably contains water and a polar solvent. The polar solvent serves as a reducing agent and to dissolve the salt. However, when the polar solvent is used alone, the reducing power is excessively strong, and hence it is difficult to produce three-dimensional magnetic material, and only green rust of non-magnetic body material having an amorphous shape is formed. Therefore, water and the polar solvent are used together, and in this case, the polar solvent acts as an appropriate reducing agent to induce a hydrolysis and condensation reaction of the magnetic particle precursor, and as a result, the precursor of the magnetic particles form an amorphous solid. Subsequently, when heating is continued, the amorphous solid undergoes a phase change and becomes crystalline.

In one embodiment of the present disclosure, when the solvent in the reaction solution contains water and a polar solvent, the content of the water can be 1 vol % to 20 vol %, preferably 5 vol % to 11 vol %, based on the weight of the polar solvent. In this case, there is an advantage in that the salt can be dissociated without suppressing the reducing power of the polar solvent.

In one embodiment of the present disclosure, the polar solvent can refer to a solvent having a dielectric constant within the range of about 75 to 85 at a specific temperature, for example, 25° C.

In one embodiment of the present disclosure, the polar solvent can be, but is not limited to, one selected from among low molecular weight polyols such as ethylene glycol, glycerin, butanediol and trimethylol propane; and high molecular weight polyols such as polyethylene glycol and methoxypolyethylene glycol. Here, the low molecular weight polyol can mean a monomolecular polyol, and the high molecular weight polyol can mean a polyol having a molecular weight (weight-average molecular weight) of 2,000 g/mol.

In one embodiment of the present disclosure, the polar solvent can include a polyol, can include at least one of a low molecular weight polyol and a high molecular weight polyol. Specifically, the polar solvent can include any one or a mixture of two or more selected from among polyols.

In one embodiment of the present disclosure, the first temperature is a temperature at which crystals of magnetic particles can be formed, and can be 50° C. to 90° C., preferably 70° C. At this temperature, there is an advantage that crystals constituting the magnetic particles can be properly formed.

In one embodiment of the present disclosure, the reaction solution prepared at room temperature can be heated to the first temperature for about 20 minutes to 60 minutes at a heating rate of about 2.5° C./min. In this case, crystalline particles having a desired size can be produced and grown. However, if the heating time is short, particles having a low magnetic property and a small crystal size will be obtained, and if the heating time is long, the crystal size will become larger, and the magnetic property increases. Here, room temperature means natural temperature without heating or cooling, and is about 20±5° C.

In one embodiment of the present disclosure, the second temperature is a temperature at which the formed magnetic particles can aggregate, is a temperature higher than the first temperature, and can be 170° C. to 210° C. The second temperature can be 175° C. or more, 180° C. or more, 185° C. or more, or 190° C. or more, and can be 205° C. or less, 200° C. or less, 195° C. or less, or 190° C. or less. This step is a process in which magnetic particles of crystal size are reduced and agglomerated, and is a step that affects the size of final particles. If the particles are treated at an excessively high temperature, they will grow into micro-sized crystals, and if the particles are treated at an excessively low temperature, the particles will grow into a form in which the number of particles having a spherical shape is small and the distribution of amorphous particles is large.

In one embodiment of the present disclosure, heating from the first temperature to the second temperature can be performed for about 40 minutes to 120 minutes at a heating rate of about 1° C./min. As the heating time increases, the dehydration/reduction reaction of the crystals proceeds further and the crystals grow in a state attached to one another, or if the heating time is insufficient, the shape and size distribution of the particles become non-uniform.

The method for producing the hot-melt adhesive composition for a water treatment element can further include a step of cooling the solution containing the magnetic particle clusters to a third temperature, before adding the surface treatment agent to the solution containing the magnetic particle clusters.

In one embodiment of the present disclosure, the third temperature can be 50° C. to 90° C. Within the above temperature range, the interaction between the magnetic particles and the surface treatment agent can be smoothly performed. In another example, the third temperature can be 55° C. or more, 60° C. or more, 65° C. or more, or 70° C. or more, and can be 85° C. or less, 80° C. or less, 75° C. or less, or 70° C. or less.

In one embodiment of the present disclosure, cooling from the second temperature to the third temperature can be performed for about 2 hours at a cooling rate of about 1° C./min. In this case, there is an advantage that the distribution of the particles is most uniform.

The magnetic particles can be additionally surface-treated. In this case, the aforementioned surface treatment agent can be referred to as a primary surface treatment agent, and a surface treatment agent that is applied for additional surface treatment can be referred to as a secondary surface treatment agent. In one example, the magnetic composite can further include a secondary surface treatment agent forming a bond with the surface treatment agent (primary surface treatment agent) or with the magnetic particles. That is, when the magnetic composite further includes the secondary surface treatment agent, the secondary surface treatment agent can be introduced to the surfaces of the magnetic particles and/or the surface of the primary surface treatment agent treated onto the surface of the magnetic particles.

A polymer compound can be used as the secondary surface treatment agent. For example, as the secondary surface treatment agent, a polymer compound having a weight-average molecular weight within the range of approximately 1,000 to 500,000 can be applied. When the secondary surface treatment agent is a polymer compound, the molecular weight (Mw) thereof in other examples can be about 1,500 or more, 2,000 or more, 2,500 or more, 3,000 or more, 3,500 or more, 4,000 or more, 4,500 or more, 5,000 or more, 5,500 or more, 6,000 or more, 6,500 or more, 7,000 or more, 7,500 or more, 8,000 or more, 8,500 or more, 9,000 or more, 9,500 or more, 10,000 or more, 12,000 or more, 14,000 or more, 16,000 or more, 18,000 or more, 19,000 or more, or 20,000 or more, or can be about 450,000 or less, 400,000 or less, 350,000 or less, 300,000 or less, 250,000 or less, 200,000 or less, 150,000 or less, 100,000 or less, 90,000 or less, 80,000 or less, 70,000 or less, 60,000 or less, 50,000 or less, 40,000 or less, 30,000 or less, or 25,000 or less.

A polymer compound that can be used as the secondary surface treatment agent can be a polyurethane-based surface treatment agent, a polyurea-based surface treatment agent, a poly(urethane-urea)-based surface treatment agent, and/or a polyester-based (specifically branched polyester-based) surface treatment agent. As the secondary surface treatment agent, among the above-mentioned polymer compounds, a compound containing a functional group interacting with the primary surface treatment agent and/or the magnetic particles can be used. Alternatively, when the secondary surface treatment agent does not contain the functional group, this functional group can be introduced to a specific polymer compound, and secondary surface treatment can be performed using the specific polymer compound.

As the secondary surface treatment agent, a compound having a functional group interacting with the primary surface treatment agent and/or the magnetic particles can be used. Examples of this functional group include, but are not limited to, the above-described phosphoric acid group, carboxyl group, sulfonic acid group, amino group and/or cyano group, or a secondary or tertiary amine group or amino group, or a urea bond.

In one example, as the secondary surface treatment agent, a polymer containing a urea unit and/or a urethane unit can also be used.

Here, the urea unit can be the following Formula D, and the urethane unit can be the following Formula E:

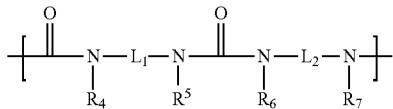

<Formula D> wherein in Formula D, $R_4$ to $R_7$ are each independently a hydrogen atom or an alkyl group, and $L_1$ and $L_2$ are each independently an aliphatic, alicyclic or aromatic divalent radical;

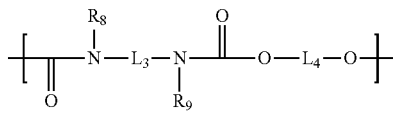

<Formula E> wherein in Formula E, $R_8$ and $R_9$ each independently a hydrogen atom or an alkyl group, and $L_3$ and $L_4$ are each independently an aliphatic, alicyclic or aromatic divalent radical.

The unit of Formula D is a so-called urea unit, and can be a reaction product of a polyamine and a diisocyanate compound. Thus, for example, $L_1$ in Formula D can be a structure derived from a diisocyanate compound participating in the reaction, and $L_2$ can be a structure derived from a polyamine participating in the reaction. Here, "structure derived" can be a structure of a portion excluding an isocyanate group from the diisocyanate compound in the case of $L_1$, and can be a structure of a portion excluding an amine group (—$NH_2$) from the polyamine compound in the case of $L_2$.

The unit of Formula E is a so-called urethane unit, and can be a reaction product of a polyol and a diisocyanate compound. Thus, for example, $L_3$ in Formula E can be a structure derived from a diisocyanate compound participating in the reaction, and $L_4$ can be a structure derived from a polyol participating in the reaction. Here, "derived structure" can be a structure of a portion excluding an isocyanate group from the diisocyanate compound in the case of $L_3$, and can be a structure of a portion excluding a hydroxyl group (—OH) from the polyol in the case of $L_4$.

Diisocyanate compounds capable of forming the structures of Formulas D and E include, for example, but are not limited to, tolylene diisocyanate, xylene diisocyanate, diphenylmethane diisocyanate, hexamethylene diisocyanate, isoborone diisocyanate, tetramethylxylene diisocyanate or naphthalene diisocyanate.

In addition, polyamines capable of forming the structure of Formula D include, for example, but are not limited to, alkylenediamines having an alkylene unit containing 1 to 20, 1 to 16, 1 to 12, 1 to 8, or 1 to 4 carbon atoms, such as ethylenediamine or propylenediamine.

Furthermore, polyols capable of forming the structure of Formula E include, for example, but are not limited to, alkylene glycols having an alkylene unit containing 1 to 20, 1 to 16, 1 to 12, 1 to 8, or 1 to 4 carbon atoms, such as ethylene glycol or propylene glycol.

Thus, polyurethane and/or polyurea or poly(urethane-urea) produced by appropriately combining the known monomers described above can be used as the secondary surface treatment agent. If necessary, the polyurethane and/or polyurea or poly(urethane-urea) can also be used after a necessary functional group is introduced thereto by a known chemical method.

As the secondary surface treatment agent, a compound having an appropriate acid value and/or amine value or not can be used depending on the type of compound to be blended with the magnetic composite. In one example, the secondary surface treatment agent can have an acid value within the range of 10 mgKOH/g to 400 mgKOH/g, or an amine value within the range of 5 mgKOH/g to 400 mgKOH/g.

In other examples, the acid value of the secondary surface treatment agent can be about 20 mgKOH/g or more, 30 mgKOH/g or more, 40 mgKOH/g or more, 50 mgKOH/g or more, 60 mgKOH/g or more, 70 mgKOH/g or more, 80 mgKOH/g or more, or 90 mgKOH/g or more, or can be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, 100 mgKOH/g or less, 90 mgKOH/g or less, 80 mgKOH/g or less, 70 mgKOH/g or less, 60 mgKOH/g or less, 50 mgKOH/g or less, 40 mgKOH/g or less, or 30 mgKOH/g or less.

In other examples, the amine value of the secondary surface treatment agent can be about 10 mgKOH/g or more, about 15 mgKOH/g or more, about 20 mgKOH/g or more, 30 mgKOH/g or more, 40 mgKOH/g or more, 50 mgKOH/g or more, 60 mgKOH/g or more, 70 mgKOH/g or more, 80 mgKOH/g or more, or 90 mgKOH/g or more, or can be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, 100 mgKOH/g or less, 90 mgKOH/g or less, 80 mgKOH/g or less, 70 mgKOH/g or less, 60 mgKOH/g or less, 50 mgKOH/g or less, 40 mgKOH/g or less, or 30 mgKOH/g or less.

As the secondary surface treatment agent, a branched polyester surface treatment agent known as a so-called branched polyester-based dispersant can also be used.

The secondary surface treatment agent can be contained in the magnetic composite in a proportion of 0.01 parts by weight to 30 parts by weight based on 100 parts by weight of the magnetic particles. In this proportion, a magnetic composite having desired performance can be formed. In other examples, the proportion can be about 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, or 5 parts by weight or more, or can be about 25 parts by weight or less, 20 parts by weight or less, 15 parts by weight or less, about 13 parts by weight or less, about 12 parts by weight or less, or about 10 parts by weight or less.

In one embodiment of the present disclosure, the heat generation amount (SAR) of the magnetic composite can be 70 W/g to 120 W/g. Preferably, the heat generation amount can be 70 W/g to 110 W/g.

When the magnetic composite satisfies the above-described range of heat generation amount, the high heat generation property of the hot-melt adhesive composition for a water treatment element according to the present disclosure can be satisfied.

The heat generation amount (SAR) can be calculated using the following Equation 1:

$$\text{Heat Generation Amount }(SAR) = \frac{C_i m_i \Delta T}{m_{Fe} \Delta t}[W/g] \quad \langle \text{Equation 1}\rangle$$

wherein:

$C_i$: The specific heat capacity of the medium (Water: 4.184 J/g·K), $m_i$: The mass of the medium (10 g), $m_{Fe}$: The mass of MNC in the medium (0.5 g), $\Delta t$=60 sec $\Delta T$: The temperature difference between the initial temperature and the temperature after 60 sec.

Since the heat generation amount is influenced by the volume of the mixture solution containing the magnetic composite, it can be calculated by setting the volume of the mixture solution to 0.35 ml and measuring an elevated average temperature. A thermocouple can be used to measure the average temperature.

In one embodiment of the present disclosure, the heat generation temperature of the magnetic composite can be 343 K to 370 K. Preferably, the heat generation temperature can be 345 K to 360 K.

Where the magnetic composite satisfies the above-described heat generation temperature, it is possible to increase the productivity of a water treatment element using the hot-melt adhesive composition for a water treatment element including the magnetic composite, reduce the defect rate thereof, and improve workability.

In one embodiment of the present disclosure, the melt flow index (MFI) of the hot-melt adhesive composition for a water treatment element is 5 g/10 min to 50 g/10 min at a temperature of 177° C. and a load of 2.16 kg.

Where the melt flow index of the hot-melt adhesive composition for a water treatment element is within the above range, it is possible to maintain the effective area appropriately during water treatment element assembly by maintaining the viscosity of the composition at a constant level.

In one embodiment of the present disclosure, the hot-melt adhesive composition for a water treatment element has an adhesive strength of 800 gf/mm to 2,500 gf/mm.

At this time, the adhesive strength was measured based on the adhesion force 800-2500 g peel-off test (ASTM D1876). Where the adhesive strength is measured by the above-described method, it is necessary to measure the adhesive strength while peeling off the composition attached to a membrane. When the hot-melt adhesive composition for a water treatment element is peeled from the membrane, the membrane is torn because the adhesive strength is excessively high. The above-described range of adhesive strength is a value measured by the corresponding method when the adhesive is torn off together with the membrane. Thus, the adhesive strength could not be accurately measured by the general method of measuring the adhesive strength of an adhesive for a water treatment element, which means that the adhesive composition of the present disclosure has a significantly higher adhesive strength than a conventional adhesive for a water treatment element.

Where the adhesive strength satisfies the above range, an operation of rolling the water treatment element can be easy, and the productivity of the water treatment element can be improved.

One embodiment of the present disclosure provides a water treatment element including an adhesive film including the hot-melt adhesive composition for a water treatment element.

For the water treatment element, components that are used in the art can be applied without limitation, except that the water treatment element includes the adhesive film including the above-described hot-melt adhesive composition for a water treatment element. In one embodiment of the present disclosure, the adhesive film can be provided on each of a pair of opposite side seals of a membrane leaf. In addition, the adhesive film can be provided on an end seal perpendicular to the pair of opposite side seals of the membrane leaf.

In the present specification, the term "perpendicular" means not only the term defined in geometry, for example, 'a state in which two straight lines, semi-linear lines or line segments meet at a right angle', but also an end seal not attached to a center tube, which are not the pair of opposite side seals of the membrane leaf.

In one embodiment of the present disclosure, the thickness of the adhesive film is 100 μm to 1,200 μm.

In one embodiment of the present disclosure, the thickness of the adhesive film is 200 μm to 400 μm.

Where the thickness of the adhesive film is 200 μm to 400 μm, the adhesive film has an excellent effect of improving the side seal portions of the water treatment element.

In the case of the side seals of the water treatment element, the adhesive portions overlap a lot, and thus the heat generation amount thereof is higher than that of the other adhesive portions (end seal), and thus it is important to control the thicknesses of the adhesive portions.

Where the adhesive film according to the present disclosure is used, the total membrane thickness can decrease due to a decrease in the thickness of the adhesive film, the proportion of metal particles can decrease, and the efficiency with which the water treatment element is produced can be improved.

Specifically, a trimming process, which is a side seal processing process during production of the water treatment element, can be omitted, and the amount of raw and subsidiary materials used can decrease.

In another embodiment of the present disclosure, the thickness of the adhesive film is 401 μm to 800 μm.

Where the thickness of the adhesive film is 401 μm to 800 μm, the adhesive film has an excellent effect of improving the end seal portion of the water treatment element.

When a water treatment element is rolled with conventional liquid glue, the original members are pushed due to a difference in line speed while being rolled up, and at the same time, the width of the end seal portion increase and it becomes difficult to maintain the thicknesses thereof at a constant level.

When a water treatment element is produced using conventional liquid glue, there are disadvantages in that while the original members are pushed due to a difference in line speed, the thicknesses thereof change and the width of the end seal increases about 2 times. In addition, it is difficult to accurately apply the liquid glue at a right angle during application in a general process in the field of water treatment elements.

However, where the end seal portion of the water treatment element is sealed with the adhesive film according to the present disclosure, the adhesive portions can be made thin while the widths thereof are maintained at a constant level, and thus the adhesive film can exhibit an excellent effect of increasing the effective area of the membrane, and can also increase the efficiency of the water treatment element due to its smaller thickness than the liquid glue.

The term "thickness of the adhesive film" refers to the length indicated by T in FIG. 2.

In one embodiment of the present disclosure, the width of the adhesive film is 5 mm to 100 mm.

Preferably, the width of the adhesive film is 15 mm to 25 mm.

Where the width of the adhesive film satisfies the above range, an operation of rolling the water treatment element can be easy, and the productivity of the water treatment element can be improved.

The term "width of the adhesive film" means the length indicated by W in FIG. 2.

In one embodiment of the present disclosure, the water treatment element can include a membrane leaf and a channel member. When the ends of the membrane leaf and the channel member are bonded to each other, the bonding can be performed using the adhesive film including the above-described hot-melt adhesive composition for a water treatment element. The ends can mean a pair of opposite side seals of the membrane leaf or an end seal perpendicular to the pair of opposite side seals of the membrane leaf.

In one embodiment of the present disclosure, the water treatment element includes at least one membrane leaf, and the adhesive film is provided on a pair of opposite side seals of the membrane leaf.

In one embodiment of the present disclosure, the water treatment element includes at least one membrane leaf, and the adhesive film is provided on an end seal perpendicular to a pair of opposite side seals of the membrane leaf.

That is, after the adhesive film is interposed between the membrane leaf and the channel member, the membrane leaf and the channel member can be bonded to each other by heating and melting the adhesive film using induction heating.

Specifically, heating and melting the adhesive film by induction heating can be performed using non-contact induction heating method by applying a magnetic field under conditions of a current of 200 A to 500 A for 1 to minutes. Specifically, it can be performed using a non-contact induction heating method by applying a magnetic field under conditions of a current of 375 A for 1 minute.

In the present disclosure, the membrane leaf is a component included in the water treatment element, and can be composed of a single membrane and can also be composed of two membranes. Where the membrane leaf is composed of a single membrane, it can be configured such that the feed side of the membrane can be folded with a feed-side channel member interposed therebetween. Where the membrane leaf is composed of two membranes, the feed sides of the membranes can be arranged to face each other, and a feed-side channel member can be positioned between the membranes. Preferably, the membrane leaf can be composed of a single membrane.

In the present specification, the channel member can refer to a feed-side channel member or a permeate-side channel member. The feed-side channel member can be a spacer, and the permeate-side channel member can be a tricot. The channel member serves as a channel providing a space through which raw water introduced through the feed channel or product water introduced through the permeate channel can flow. The shape and type of the channel member are not particularly limited, and a channel member that is used in the art can be applied. The materials of the feed-side channel member and the permeate-side channel member are not particularly limited, and can be the same or different materials.

In one embodiment of the present disclosure, the feed-side channel member can be expressed as a spacer or a feed spacer, and can serve to maintain a constant gap between one membrane and another membrane so that external water (raw water) containing foreign substances can be received in the gap.

In one embodiment of the present disclosure, the permeate-side channel member can be expressed as a tricot, and refers to a space or passage inside one membrane folded in half so that product water filtered by the membrane can be received therein. The tricot has a structure made of a fabric or a knitted fabric, and can have a porous surface structure capable of providing a space through which product water can flow out.

The water treatment element can further include a center tube, in addition to the membrane leaf and the channel member. Specifically, a folded portion or a sealed portion of the membrane leaf can be disposed to face the center tube, so that a plurality of membrane leaves and channel members can be wound. When wound in this way, the water treatment element is produced in a spiral wound form.

In the present disclosure, the center tube serves as a passage through which filtered product water (purified water) is introduced and discharged.

The shape of the center tube is not particularly limited, but is preferably located at the center of the water treatment element. In addition, one side of the center tube can be open so that product water can be discharged therethrough.

In one embodiment of the present disclosure, the center tube can include a plurality of openings. When water treatment is performed by the water treatment element, product water is introduced into the center tube through the plurality of openings of the center tube, and then the introduced product water is discharged through one open side of the center tube.

The material of the center tube is not particularly limited, and a general material known in the art can be used.

In one embodiment of the present disclosure, the method can further include a step of wrapping the water treatment element so that the water treatment element is maintained in a wound form.

The wrapped water treatment elements can be connected in series or parallel and accommodated in a pressure vessel, and can be used as a membrane module. Specifically, the membrane module can be used for water treatment, and when it is used for water treatment, raw water can be seawater, but is not limited thereto.

In one embodiment of the present disclosure, the membrane included in the membrane leaf can refer to a water treatment membrane or a gas separation membrane. The water treatment membrane can be used as a microfiltration membrane, an ultrafiltration membrane, a nanofiltration membrane or a reverse osmosis membrane, and preferably, can be used as a reverse osmosis membrane.

In one embodiment of the present disclosure, the membrane can be a water treatment membrane.

In one embodiment of the present disclosure, the membrane can be a reverse osmosis membrane.

In another embodiment of the present disclosure, the membrane can be a gas separation membrane.

In one embodiment of the present disclosure, the membrane includes a porous layer and a polyamide active layer provided on the porous layer.

The polyamide active layer can be formed through steps of: forming an aqueous solution layer containing an amine compound on the porous layer; and forming the polyamide active layer by bringing an organic solution containing an acyl halide compound into contact with the aqueous solution layer containing the amine compound.

As the porous layer, a layer formed by coating a nonwoven fabric with a polymer material can be used. Examples of the polymer material include, but are not necessarily limited to, polysulfone, polyethersulfone, polycarbonate, polyethylene oxide, polyimide, polyetherimide, polyetheretherketone, polypropylene, polymethylpentene, polymethyl chloride, and polyvinylidene fluoride. Specifically, polysulfone can be used as the polymer material. The coating layer can be a polysulfone layer.

Polyethylene terephthalate can be used as the material of the nonwoven fabric, but the material is not limited thereto.

The thickness of the nonwoven fabric can be, but is not limited to, 50 μm to 150 μm. Preferably, the thickness thereof can be 80 μm to 120 μm. Where the thickness of the nonwoven fabric satisfies the above range, the durability of the membrane including the porous support including the nonwoven fabric can be maintained.

The thickness of the coating layer can be, but is not limited to, 20 μm to 100 μm. Preferably, the thickness thereof can be 40 μm to 80 μm. Where the thickness of the coating layer satisfies the above range, the durability of the membrane including the porous support including the coating layer can be maintained.

According to an example, the coating layer can be formed using a polysulfone-containing polymer solution. The polysulfone-containing polymer solution can be a homogeneous liquid obtained by adding, based on the total weight of the polysulfone-containing polymer solution, 10 wt % to 20 wt % of a polysulfone solid to 80 wt % to 90 wt % of the solvent dimethylformamide, followed by dissolving at 80° C. to 85° C. for 12 hours, but the weight ranges of the polysulfone and the solvent are not limited to the above ranges.

When the polysulfone solid is included within the above range based on the total weight of the polysulfone-containing polymer solution, the durability of the membrane including the porous layer including the coating layer can be maintained.

The coating layer can be formed by a casting method. The term "casting" refers to a solution casting method, and specifically, can refer to a method in which the polymer material is dissolved in a solvent and then developed on a non-adhesive smooth surface, and then the solvent is replaced. Specifically, the method of replacing the solvent can be performed using a nonsolvent induced phase separation method. In the nonsolvent induced phase separation method, a polymer is dissolved in a solvent to form a homogeneous solution, and the solution is formed into a predetermined shape and then immersed in a non-solvent. Thereafter, the composition of the polymer solution changes while the non-solvent and the solvent are exchanged by diffusion, and the portions occupied by the solvent and the non-solvent are formed into pores while precipitation of the polymer occurs.

The polyamide active layer can be formed by producing polyamide by interfacial polymerization during the contact and reaction between an amine compound and an acyl halide compound and adsorbing the polyamide onto the above-described porous layer. The contact can be performed through a method such as dipping, spray, or coating. As interfacial polymerization conditions, those known in the art can be used without limitation.

In order to form the polyamide active layer, an aqueous solution layer containing an amine compound can be formed on the porous layer. A method of forming the aqueous solution layer including an amine compound on the porous layer is not particularly limited, and any method capable of forming the aqueous solution layer on the porous support can be used without limitation. Specifically, examples of a method of forming the aqueous solution layer containing an amine compound on the porous layer include spraying, coating, dipping, dropping, coating, and the like.

In this case, the aqueous solution layer can be additionally subjected to a step of removing an excess of the aqueous solution containing an amine compound, if necessary. The aqueous solution layer formed on the porous layer can be non-uniformly distributed when the amount of the aqueous solution present on the porous layer is excessively large. When the aqueous solution layer is non-uniformly distributed, a non-uniform polyamide active layer can be formed by subsequent interfacial polymerization. For this reason, it is preferable to remove an excess of the aqueous solution after forming the aqueous solution layer on the porous layer. The excess of the aqueous solution can be removed using, but not particularly limited to, for example, a sponge, an air knife, nitrogen gas blowing, natural drying, or a compression roll.

In the aqueous solution containing the amine compound, the amine compound is not limited as to the type thereof as long as it is an amine compound that is used to produce a membrane. However, in a specific example, the amine compound is preferably m-phenylenediamine, p-phenylenediamine, 1,3,6-benzene-triamine, 4-chloro-1,3-phenylenediamine, 6-chloro-1,3-phenylenediamine, 3-chloro-1,4-phenylenediamine, or a mixture thereof.

The solvent of the aqueous solution containing the amine compound can be water, and further include acetone, dimethyl sulfoxide (DMSO), 1-methyl-2-pyrrolidinone (NMP) or hexamethylphosphoramide (HMPA).

The content of the amine compound can be 1 wt % to wt % based on the total weight of the composition. When the above content is satisfied, the desired salt removal rate and flow rate in the present disclosure can be ensured.

The polyamide active layer can be formed by coating the porous layer with an aqueous solution containing an amine compound and then bringing an organic solution containing an acyl halide compound into contact therewith, followed by interfacial polymerization.

The acyl halide compound is not limited as long as it can be used in the production of polyamide. However, in a specific example, it is preferable to use one or a mixture of two or more compounds selected from the group consisting of trimesoyl chloride, isophthaloyl chloride, and terephthaloyl chloride, which are aromatic compounds having 2 to 3 carboxylic acid halides.

The content of the acyl halide compound can be 0.01 wt % to 0.5 wt % based on the total weight of the composition. When the content is satisfied, excellent salt removal rate and flow rate can be achieved.

Examples of the organic solvent contained in the organic solution containing the acyl halide compound include, but are not limited to, aliphatic hydrocarbon solvents, for example, freons and water-immiscible hydrophobic solvents such as hexanes, cyclohexane, heptane, and alkanes having 5 to 12 carbon atoms, for example, alkanes having 5 to 12 carbon atoms and mixtures thereof, such as IsoPar (Exxon), ISOL-C (SK Chem), and ISOL-G (Exxon).

The content of the organic solvent can be 95 wt % to 99.99 wt % based on the total weight of the organic solution containing the acyl halide compound, but is not limited thereto. When the content is satisfied, excellent salt removal rate and flow rate can be achieved.

The thickness of the polyamide active layer can be nm to 1,000 nm, but is not limited thereto. The thickness thereof can preferably be 300 nm to 500 nm. When the thickness of the polyamide active layer satisfies the above range, excellent salt removal rate and flow rate can be achieved.

FIG. 1 shows a top view of a membrane leaf (M) including an adhesive film composed of a hot-melt adhesive composition for a water treatment element according to the present disclosure, and FIG. 2 shows a perspective view of the membrane leaf. After an adhesive film 10 or 20 is interposed between a membrane leaf and a channel member, the adhesive film 10 or 20 is heated and melted using induction heating. Since the hot-melt adhesive composition for a water treatment element according to the present disclosure is in a solid form, it has an advantage in that it is easy to control the adhesive area and thickness, and thus a rolling operation is easy. In addition, the adhesive composition has advantages that the curing time thereof is short, the process is simplified, and workability in the production of a water treatment element can be improved. Where a liquid polyurethane adhesive composition is used as in Comparative Examples to be described later, the effective area can be decreased in the process of producing the water treatment element, and thus a portion of the membrane can be lost. In addition, there is a disadvantage in that, since the liquid adhesive composition is not immediately set after application, it is difficult to control the thickness and area thereof. Moreover, the defect rate of the water treatment element can increase due to leaks occurring during a rolling process. In addition, there is a disadvantage that the curing time of the liquid adhesive composition is long. In contrast, the hot-melt adhesive composition for a water treatment element according to the present disclosure can overcome the disadvantages of the liquid polyurethane adhesive composition described above. The adhesive film 10 can be provided on a pair of opposite side seals of the membrane leaf. In addition, the adhesive film 20 can be provided on an end seal perpendicular to the pair of opposite side seals of the membrane leaf.

FIG. 3 is a schematic view showing a stack of components constituting the water treatment element according to the present disclosure. The water treatment element of the present disclosure can be produced by alternately arranging a plurality of membrane leaves 2 and a plurality of channel members. The channel members can be feed-side channel members 1-2 or permeate-side channel members 1-1. The adhesive film can be provided between each of the plurality of arranged membrane leaves 2 and each of the plurality of channel members, thus providing a water treatment element.

EXAMPLES

Hereinafter, the present disclosure will be described in detail with reference to examples. However, the examples according to the present disclosure can be modified into various different forms, and the scope of the present disclosure is not construed as being limited to the examples described below. The examples in the present specification are provided to more completely describe the present disclosure to those skilled in the art.

Example 1

Based on 100 parts by weight of a hot-melt adhesive composition for a water treatment element, 5 parts by weight of iron oxide (Bayoxide E8712, LANXESS) which is a magnetic composite and 95 parts by weight of a polymer resin (WINMELT AT, Woojin) were mixed together, and then the mixture was passed through a screw extruder, thus producing the hot-melt adhesive composition for a water treatment element. The hot-melt adhesive composition for a water treatment element was in the form of a film having a size of 20 mm (width)×1,000 mm (length).

The produced hot-melt adhesive composition for a water treatment element was placed on side seals and an end seal of a membrane as shown in FIG. 1, and then wound, thus producing a water treatment element in a spiral wound form.

Then, the water treatment element in a wound spiral form was placed in a magnetic field coil, and bonding using a non-contact induction heating method was performed by applying a magnetic field under conditions of a current of 375 A thereto for 1 minute.

The thickness of the hot-melt adhesive composition applied to the water treatment element was 300 μm, and the width thereof was 20 mm.

Example 2

An adhesive film of Example 2 and a water treatment element including the same were produced using the same method and conditions as described in Example 1, except that the hot-melt adhesive composition for a water treatment element having the thickness and width shown in Table 1 below was applied to the water treatment element and was placed on side seals shown in FIG. 1.

TABLE 1

|  | Thickness (μm) | Width (mm) |
| --- | --- | --- |
| Example 2 | 200 | 20 |

Examples 3 and 4

Adhesive films of Examples 3 and 4 and water treatment elements including the same were produced using the same method and conditions as described in Example 1, except that the hot-melt adhesive composition for a water treatment element having the thickness and width shown in Table 2 below was applied to the water treatment elements, the magnetic field was applied for the time shown in Table 2 below, and the hot-melt adhesive composition was placed only on end seal shown in FIG. 1.

TABLE 2

|  | Thickness (μm) | Width (mm) | Application time (min) | Results |
| --- | --- | --- | --- | --- |
| Example 3 | 450 | 30 | 3 | Adhered well |
| Example 4 | 450 | 30 | 1 | Did not adhere well and affected other membranes |

Comparative Example 1

Water treatment elements were produced in the same manner as in Example 1, except that a liquid polyurethane adhesive (H. B. Fuller, UR3519) was used instead of the hot-melt adhesive composition for a water treatment element in Example 1.

The thicknesses and widths applied when producing the adhesive films using the liquid polyurethane adhesive, and the average values thereof are described in Table 3 below.

TABLE 3

| Comparative | Thickness (μm) | | Width (mm) | |
| --- | --- | --- | --- | --- |
| Example 1 | Side | End | Side | End |
| #1 | 510 | 724 | 48.3 | 52.4 |
| #2 | 507 | 737 | 49.2 | 51.7 |
| #3 | 508 | 709 | 50.4 | 51.9 |
| #4 | 515 | 731 | 49.5 | 51.3 |
| #5 | 516 | 725 | 47.5 | 49.2 |
| #6 | 510 | 732 | 49.5 | 45.3 |
| #7 | 510 | 734 | 49.8 | 45.1 |
| #8 | 520 | 724 | 50.5 | 50.1 |
| #9 | 516 | 724 | 45.7 | 45.2 |
| #10 | 515 | 709 | 51.0 | 51.4 |
| Average | 513 | 725 | 49.2 | 49.4 |

Experiments on Examples 1 to 4 and Comparative Example 1

<Measurement of Permeate Flow Rate and Salt Removal Rate>

Experiments were conducted using the water treatment elements of Examples 1 to 4 and Comparative Example 1. Feed raw water with a NaCl concentration of 2,000 ppm was passed through each of the water treatment elements at a raw water pressure of 225 psi. Pure water filtered through the membrane of each of the water treatment elements was discharged through the center tube. At this time, the ratio (recovery) of the flow rate of the product water and the flow rate of the feed raw water was set to 15%. This condition was set as a standard condition. After 1 hour of operation for stabilization of each of the water treatment elements, the flow rate and salt removal rate through each of the water treatment elements were determined by measuring the flow rate of the product water and the electrical conductivity thereof. The results are shown in Table 4 below.

TABLE 4

|  | Permeate flow rate (GFD) | Salt removal rate (%) |
| --- | --- | --- |
| Example 1 | 12,542 | 99.73 |
| Example 2 | 12,605 | 99.72 |
| Example 3 | 12,403 | 99.73 |
| Comparative Example 1 | 12,604 | 99.72 |

Referring to Table 4 above, it was confirmed that Examples 1 to 3 that bonded through the non-contact induction heating method exhibited the same level of performance as Comparative Example 1 using the liquid glue. Thereby, it was confirmed that the existing liquid glue can be replaced with the induction glue as described in Examples 1 to 3. When the hot-melt adhesive composition of the present disclosure, which is an induction glue that can replace the liquid glue, is used in the production of a water treatment element, it is possible to improve the process by reducing the defect rate of the water treatment element, increasing the productivity thereof, and improving workability.

<Checking for Leaks through Autopsy>

In order to check whether there is a problem in the folding or winding process, water containing a dye was allowed to flow toward the product water channel side of the water treatment element, and the degree of dyeing of the damaged portion of the membrane and whether leaks would occur during assembly were visually checked. The results of the checking are shown in Table 5 below.

TABLE 5

|  | Presence of leaks | Criteria for judgment |
| --- | --- | --- |
| Example 1 | X | Based on autopsy and salt removal rate |
| Example 2 | X | Based on autopsy and salt removal rate |
| Example 3 | X | Based on autopsy and salt removal rate |
| Example 4 | X | Based on autopsy and salt removal rate |
| Comparative Example 1 | X | Based on autopsy and salt removal rate |

Through the above-described salt removal rate measurement and autopsy, it was confirmed that there was no leak in Examples 1 to 4 and Comparative Example 1. Accordingly, it was confirmed that, when the hot-melt adhesive composition for a water treatment element according to the present disclosure is used in the production of a water treatment element, it is possible to reduce the defect rate of the water treatment element, increase the productivity thereof, and improve workability.

<Checking for Leaks through Checking of Vacuum Level<

Air was vented through a vacuum pump from the center tube side (product water side) of the water treatment element after completion of winding in Example 3 and Comparative Example 1, and whether there would be a leak in the element was determined by measuring how much the level of vacuum was maintained. Specifically, while air was suctioned by the vacuum pump, the initial vacuum pressure was measured for how much vacuum was held for 30 seconds based on 1,000 mbar. Next, while the suction of air by the vacuum pump was stopped, the end vacuum pressure was measured for how much vacuum was released for 30 seconds. The difference between the initial vacuum pressure and the end vacuum pressure was calculated to determine how much the vacuum level was maintained. The results are shown in Table 6 below.

TABLE 6

|  | Average initial vacuum level (mbar) | Average end vacuum level (mbar) |
|---|---|---|
| Example 3 | 53.6 | 71.1 |
| Comparative Example 1 | 44.7 | 68.0 |

<Production of Magnetic Composite>

Experimental Example 1

(1) A raw material was prepared by mixing a magnetic particle precursor (iron (III) chloride hexahydrate), an aqueous solvent (distilled water) and a base (sodium acetate) with a polar solvent (ethylene glycol). The mixing was performed such that the concentrations of the magnetic particle precursor and the base in the raw material were 0.1 M and 1.09 M, respectively, and the content of the aqueous solvent was 10.67 vol % based on the volume of the polar solvent. At this time, 160 mL of the aqueous solvent (distilled water) and 1,500 mL of the polar solvent (ethylene glycol) were used.

(2) The raw material was heated from room temperature (about 23° C.) to a temperature of about 70° C. (at a heating rate of about 2.5° C./min for 20 to 60 minutes) to produce crystals.

(3) The crystals produced in step (2) were clustered by heating the raw material subjected to step (2) to a temperature of about 190° C. (at a heating rate of about 1° C./min for 40 minutes to 120 minutes).

(4) The raw material subjected to step (3) was cooled to a temperature of about 70° C. (at a cooling rate of about 1° C./min for 2 hours), and a surface treatment agent (a polyacrylic acid having a weight-average molecular weight of 5,100 g/mol, Sigma Aldrich) was mixed with the cooled raw material in an amount of about 4.8 parts by weight based on 100 parts by weight of the magnetic particle precursor applied to the raw material.

Experimental Example 2

A magnetic composite was produced in the same manner as in Experimental Example 1, except that, in step (1), the mixing was performed such that the concentrations of the magnetic particle precursor and the base in the raw material were 0.05 M and 0.76 M, respectively, the aqueous solvent was mixed in an amount of 5.26 vol % based on the volume of the polar solvent, and in step (4), the surface treatment agent was mixed with the cooled raw material in an amount of about 19.4 parts by weight based on 100 parts by weight of the magnetic particle precursor applied to the raw material.

Experimental Example 3

A magnetic composite was produced in the same manner as in Experimental Example 1, except that, in step (1), the mixing was performed such that the concentrations of the magnetic particle precursor and the base in the raw material were 0.05 M and 0.76 M, respectively, the aqueous solvent was mixed in an amount of 5.26 vol % based on the volume of the polar solvent, and in step (4), a surface treatment agent (a polyacrylic acid having a weight-average molecular weight of 15,000, Sigma-Aldrich) was mixed with the cooled raw material in an amount of about 19.4 parts by weight based on 100 parts by weight of the magnetic particle precursor applied to the raw material.

Experimental Example 4

A magnetic composite was produced in the same manner as in Experimental Example 1, except that, in step (1), the mixing was performed such that the concentrations of the magnetic particle precursor and the base in the raw material were 0.05 M and 0.76 M, respectively, the aqueous solvent was mixed in an amount of 5.26 vol % based on the volume of the polar solvent, and in step (4), the surface treatment agent (CS20A known as a phosphate-based monomolecular dispersant, CRODA Co., Ltd.) was mixed with the cooled raw material in an amount of about 16.67 parts by weight based on 100 parts by weight of the magnetic particle precursor applied to the raw material.

Experimental Example 5

A magnetic composite was produced in the same manner as in Experimental Example 1, except that, in step (1), the mixing was performed such that the concentrations of the magnetic particle precursor and the base in the raw material were 0.05 M and 0.76 M, respectively, the aqueous solvent was mixed in an amount of 5.26 vol % based on the volume of the polar solvent, and in step (4), the surface treatment agent (Disper-111 known as a phosphate-based copolymer dispersant, BYK Co., Ltd.) was mixed with the cooled raw material in an amount of about 16.67 parts by weight based on 100 parts by weight of the magnetic particle precursor applied to the raw material.

Experimental Example 6

(1) A raw material was prepared by mixing a magnetic particle precursor (iron (III) chloride hexahydrate), an aqueous solvent (distilled water), a base (sodium acetate) and a surface treatment agent (a polyacrylic acid having a weight-average molecular weight of 5,100, Sigma Aldrich) with a polar solvent (ethylene glycol). The mixing was performed such that the concentrations of the magnetic particle precursor and the base in the raw material were 0.05 M and 0.76 M, respectively, and the content of the aqueous solvent was 5.26 vol % based on the volume of the polar solvent. In addition, the surface treatment agent was mixed in an amount of about 19.44 parts by weight based on 100 parts by weight of the magnetic particle precursor.

(2) The raw material was heated from room temperature (about 23° C.) to a temperature of about 70° C. (at a heating rate of about 2.5° C./min for 20 minutes) to produce crystals.

(3) The crystals produced in step (2) were clustered by heating the raw material subjected to step (2) to a temperature of about 190° C. (at a heating rate of about 1° C./min for 120 minutes).

(4) The raw material subjected to step (3) was cooled to a temperature of about 70° C. (at a cooling rate of about 1° C./min for 2 hours).

Experimental Example 7

A magnetic composite was produced in the same manner as in Experimental Example 6, except that, in step (1), the mixing was performed such that the concentrations of the magnetic particle precursor and the base in the raw material were 0.09 M and 1.43 M, respectively, the aqueous solvent was mixed in an amount of 10.53 vol % based on the volume of the polar solvent, and the surface treatment agent was mixed in an amount of about 9.72 parts by weight based on 100 parts by weight of the magnetic particle precursor.

Experimental Example 8

A magnetic composite was produced in the same manner as in Experimental Example 6, except that, in step (1), the mixing was performed such that the concentrations of the magnetic particle precursor and the base in the raw material were 0.05 M and 0.76 M, respectively, the aqueous solvent was mixed in an amount of 5.26 vol % based on the volume of the polar solvent, and the surface treatment agent (a polyacrylic acid having a weight-average molecular weight of 15,000, Sigma Aldrich) was mixed in an amount of about 19.44 parts by weight based on 100 parts by weight of the magnetic particle precursor.

Experimental Example 9

A magnetic composite was produced in the same manner as in Experimental Example 6, except that, in step (1), CS20A (CRODA Co., Ltd.) known as a phosphate-based monomolecular dispersant was used as the surface treatment agent, the mixing was performed such that the concentrations of the magnetic particle precursor and the base in the raw material were 0.09 M and 1.43 M, respectively, the aqueous solvent was mixed in an amount of 10.53 vol % based on the volume of the polar solvent, and the surface treatment agent was mixed in an amount of about 8.33 parts by weight based on 100 parts by weight of the magnetic particle precursor.

Experimental Example 10

A magnetic composite was produced in the same manner as in Experimental Example 6, except that, in step (1), Disper-111 (BYK Co., Ltd.) known as a phosphate-based copolymer dispersant was used as the surface treatment agent, the mixing was performed such that the concentrations of the magnetic particle precursor and the base in the raw material were 0.05 M and 0.76 M, respectively, the aqueous solvent was mixed in an amount of 5.26 vol % based on the volume of the polar solvent, and the surface treatment agent was mixed in an amount of about 16.67 parts by weight based on 100 parts by weight of the magnetic particle precursor.

<Production of Hot-Melt Adhesive Composition for Water Treatment Element>

Based on 100 parts by weight of a hot-melt adhesive composition for a water treatment element, 5 parts by weight of each of the magnetic composites produced in Experimental Examples 1 to 10 and 95 parts by weight of a polymer resin (WINMELT AT, Woojin) were mixed together, and each of the mixtures was passed through a screw extruder, thus producing hot-melt adhesive compositions for a water treatment element. Each of the hot-melt adhesive compositions for a water treatment element was in the form of a film having a size of 20 mm (width)×1,000 mm (length).

Each of the produced hot-melt adhesive compositions for a water treatment element was placed on side seals and an end seal of a membrane as shown in FIG. 1, and then wound, thus producing water treatment elements in a spiral wound form.

Then, each of the water treatment elements in a wound spiral form was placed in a magnetic field coil, and bonding using a non-contact induction heating method was performed by applying a magnetic field thereto under conditions of a current of 375 A and a rotating speed of 60 rpm for 10 minutes.

The thickness and width of each hot-melt adhesive composition applied to the water treatment element was 300 μm, and 20 mm, respectively.

Experiments on Experimental Examples 1 to 10

<Measurement of Crystal Size>

The sizes of magnetic domains (=crystals) of the magnetic particles in the magnetic composites synthesized in Experimental Examples 1 to 10 were measured according to the following method.

(1) The signal intensity of each magnetic composite in a 2θ diffraction angle range of 10° to 90° was measured using the XRD-07-D8 Endeavor system (Brucker) according to the manual of the system.

(2) In the X-ray diffraction analysis results obtained in step (1), the size of the crystal was measured by substituting the result value in a 2θ range of 60.824° to 64.957° showing a peak at 62.57° into Equation 3 below. The results of the measurement are shown in Table 8 below.

$$\tau = (K+\lambda)/(\beta + \cos(\theta)) \qquad \text{<Equation 3>}$$

In Equation 3 above,

τ is the crystal size, K is a Scherrer constant which is 0.94 for the full width at half maximum of the spherical crystal having cubic symmetry, λ is the X-ray wavelength, β is the full width at half maximum of the diffraction peak, and θ is the Bragg diffraction angle.

<Measurement of Average Particle Diameter>

(1) The magnetic composites produced in Experimental Examples 1 to 10 were coated with platinum (Pt) using a Cressington Sputter Coater 108 model in an auto mode for about 60 to 90 seconds, thus preparing specimens.

(2) The magnetic composite specimens were photographed using a field effect scanning electron micrograph (FESEM, JSM7610F, JEOL Co., Ltd.) according to the manufacturer's manual, thus obtaining SEM photographs of the magnetic composites.

(3) Through the SEM photographs of the magnetic composites, whether the magnetic particles were clustered was checked, and the average particle diameter of the magnetic composites was measured. The results are shown in Table 7 below.

TABLE 7

| | Crystal size (nm) | Average particle diameter (nm) |
|---|---|---|
| Experimental Example 1 | 30.6 | 100 |
| Experimental Example 2 | 28.2 | 85 |
| Experimental Example 3 | 24 | 60 |
| Experimental Example 4 | 26.8 | 110 |
| Experimental Example 5 | 29.1 | 80 |
| Experimental Example 6 | 8.4 | 100 |
| Experimental Example 7 | 10.5 | 85 |
| Experimental Example 8 | 7.6 | 30 |
| Experimental Example 9 | 12.4 | 90 |
| Experimental Example 10 | 6.9 | 40 |

Referring to Table 7 above, it can be confirmed that, in Experimental Examples 1 to 5, the crystal sizes of the magnetic particles satisfied the range of 15 nm to 40 nm, but in Experimental Examples 6 to 10, the crystal sizes of the magnetic particles were less than 15 nm. It can be seen that the magnetic particles in the magnetic composites of Experimental Examples 1 to 5 had a smoother surface than the magnetic composites of Experimental Examples 6 to 10, and the magnetic particles in the magnetic composites of the Examples were in the form of clustered crystals, and each magnetic particle was surface-treated with the surface treatment agent. In the magnetic particles of the magnetic composites of Experimental Examples 6 to 10 in which the surface treatment agent was added at a different time point, the surface treatment agent was introduced to the surface of the crystal, and thus had a relatively small crystal size compared to that in each of Experimental Examples 1 to 5.

<Measurement of Heat Generation Amount>

The heat generation amount (SAR) was calculated using the following Equation 1.

$$\text{Heat Generation Amount }(SAR) = \frac{C_i m_i \Delta T}{m_{Fe} \Delta t} [W/g] \quad \langle \text{Equation 1} \rangle$$

wherein:

$C_i$: The specific heat capacity of the medium (Water: 4.184 J/g·K), $m_i$: The mass of the medium (10 g), $m_{Fe}$: The mass of MNC in the medium (0.5 g), $\Delta t = 60$ sec $\Delta T$: The temperature difference between the initial temperature and the temperature after 60 sec.

Since the heat generation amount is influenced by the volume of the mixture solution containing the magnetic composite, it was calculated by setting the volume of the mixture solution to 0.35 ml and measuring an elevated average temperature. Measurement of the average temperature was performed using a thermocouple. The results of the measurement are shown in Table 8 below.

<Measurement of Heat Generation Temperature>

The heat generation temperature was measured by applying an alternate magnetic field to 0.35 mL of a magnetic fluid, prepared by dissolving 0.5 g of the magnetic particle powder in 10 g of water, under conditions of a current of 120.4 A and a frequency of 310 kHz for 60 seconds, and the results of the measurement are shown in Table 8 below.

<Visual Checking for Adhesion>

The degrees of adhesion of the produced hot-melt adhesive compositions to the water treatment element were visually checked, and the results are shown in Table 8 below.

TABLE 8

| | Heat generation amount (W/g) | Heat generation temperature (K) | Visual checking for adhesion |
|---|---|---|---|
| Experimental Example 1 | 78.9 | 350.6 | Adhered |
| Experimental Example 2 | 95.4 | 362.4 | Adhered |
| Experimental Example 3 | 72.2 | 345.8 | Adhered |
| Experimental Example 4 | 91.4 | 359.5 | Adhered |
| Experimental Example 5 | 81.3 | 352.3 | Adhered |
| Experimental Example 6 | 50.2 | 330.0 | Partially adhered |
| Experimental Example 7 | 49.0 | 329.1 | Partially adhered |
| Experimental Example 8 | 26.8 | 313.2 | Not adhered |
| Experimental Example 9 | 48.4 | 328.7 | Partially adhered |
| Experimental Example 10 | 27.2 | 313.5 | Partially adhered |

Referring to Table 8 above, it was confirmed that, in the case of Experimental Examples 1 to 5 in which the crystal sizes of the magnetic particles satisfied the range of 15 nm to 40 nm, the adhesive film adhered well to the water treatment element, but in the case of Experimental Examples 6 to 10 in which the crystal sizes of the magnetic particles were less than 15 nm, the adhesive film partially adhered or did not adhere, so that the degree of adhesion thereof decreased, and thus a leak could occur in the water treatment element. Accordingly, it was confirmed that, when the hot-melt adhesive composition for a water treatment element according to the present disclosure is used for the production of a water treatment element, it is possible to reduce the defect rate of the water treatment element, increase the productivity thereof, and improve workability. Although preferred embodiments of the present disclosure have been described above, the present disclosure is not limited thereto and can be embodied in various modified forms without departing from the scope of the claims and the detailed description of the disclosure, and these modifications also fall within the scope of the present disclosure.

The invention claimed is:

1. A hot-melt adhesive composition for a water treatment element, the hot-melt adhesive composition containing a polymer resin and a magnetic composite,
   wherein the magnetic composite comprises magnetic particle clusters formed by agglomeration of magnetic particles having crystal sizes within a range of 15 nm to 40 nm, and
   wherein the magnetic particle clusters have an average particle diameter of 20 nm to 300 nm, and
   wherein the magnetic composite comprises a phosphate-based dispersant as a surface treatment agent provided on surfaces of the magnetic particle clusters, and
   wherein the heat generation amount (SAR) of the magnetic composite when placed in a magnetic field coil operating under conditions of a current of 200 A to 500 A is 70 W/g to 110 W/g.

2. The hot-melt adhesive composition of claim 1, wherein the polymer resin is present in an amount of 90 to 99.9 parts by weight based on 100 parts by weight of the hot-melt adhesive composition, and the magnetic composite is present in an amount of 0.1 to 10 parts by weight based on 100 parts by weight of the hot-melt adhesive composition.

3. The hot-melt adhesive composition of claim 1, which has a melt flow index (MFI) of 5 g/10 min to 50 g/10 min at 177° C. and 2.16 kg.

4. The hot-melt adhesive composition of claim 1, which is cured under conditions of a temperature of 150° C., a pressure of 70 kg/cm² and a curing time of 30 seconds.

5. An adhesive film, comprising the hot-melt adhesive composition for a water treatment element according to claim 1.

6. The adhesive film of claim 5, which has a thickness of 200 μm to 400 μm.

7. The adhesive film of claim 5, which has a thickness of 401 μm to 800 μm.

8. The adhesive film of claim 5, which has a width of 5 mm to 100 mm.

9. A water treatment element comprising the adhesive film according to claim 8.

10. The water treatment element of claim 9, which comprises at least one membrane leaf, wherein the adhesive film is provided on a pair of opposite side seals of the membrane leaf.

11. The water treatment element of claim 9, which comprises at least one membrane leaf, wherein the adhesive film is provided on an end seal perpendicular to a pair of opposite side seals of the membrane leaf.

\* \* \* \* \*